United States Patent [19]

Faigley, Jr.

[11] 4,317,601
[45] Mar. 2, 1982

[54] POLYMER CAGE FOR A TAPERED ROLLER BEARING

[75] Inventor: Charles W. Faigley, Jr., East Sparta, Ohio

[73] Assignee: The Timken Company, Canton, Ohio

[21] Appl. No.: 135,693

[22] Filed: Mar. 31, 1980

[51] Int. Cl.³ .................. F16C 19/00; F16C 21/00; F16C 33/04; F16C 27/04
[52] U.S. Cl. .................. 308/202; 308/211; 308/214; 308/217; 308/218
[58] Field of Search .............. 308/214, 215, 217, 216, 308/218, 211, 212, 202

[56] References Cited

U.S. PATENT DOCUMENTS

| | | | |
|---|---|---|---|
| 2,435,839 | 2/1948 | McNicoll | 308/214 |
| 3,420,589 | 1/1969 | Green et al. | 308/174 |
| 3,477,773 | 11/1969 | Altson | 308/214 |
| 3,694,043 | 9/1972 | Tellson | 308/218 |
| 3,940,193 | 2/1976 | Molloy | 308/214 |
| 4,136,916 | 1/1979 | Musselman et al. | 308/214 |

*Primary Examiner*—Henry K. Artis
*Attorney, Agent, or Firm*—Gravely, Lieder & Woodruff.

[57] ABSTRACT

A molded polymer cage for a tapered roller bearing has end rings that are located beyond and extend across the large and small ends of the tapered rollers for the bearing and bridges that extend between and are formed integral with the two rings so as to form pockets in which the tapered rollers are confined. The cage not only spaces the rollers at even intervals between the cup and cone, but it further holds the rollers around the cone when the cone is separated from the cup. To this end, the bridges of the cage are located entirely beyond the pitch circle for the rollers so as to leave adequate space for the introduction and circulation of a lubricant, and each bridge along each of its side faces has two beveled surfaces, namely, an inner surface and an outer surface, both of which are planar. The outer surface is located further from the cone and pitch circle than the inner surface and is further disposed at a lesser angle with respect to the pitch circle. As a consequence, the outer surfaces of the bridges lap sufficiently over the rollers to provide the cage with excellent retention characteristics.

10 Claims, 6 Drawing Figures

POLYMER CAGE FOR A TAPERED ROLLER BEARING

BACKGROUND OF THE INVENTION

This invention relates in general to tapered roller bearings and more particularly to molded polymer cages for such bearings.

The typical cage for maintaining the proper spacing between the rollers of a tapered roller bearing is a metal stamping having pockets in which the rollers are received. To be more specific, the cage has a small end ring that extends across the small end faces of the tapered rollers, a large end ring that extends across the large end faces of the rollers, and bridges that connect the two rings and actually separate the rollers. Not only does the cage maintain the correct spacing between the rollers, but it further serves to retain the rollers about the cone or inner race. In other words, it unites the cone, the rollers, and of course the cage into a cone assembly which remains intact when removed from the cup or outer race. To this end, the typical stamped metal cage is located beyond the pitch circle, that is beyond the axes of rotation for the individual rollers, and further has the side planar edges of its bridges beveled to conform tangentially to the contour of the adjacent sides of the rollers. Indeed, stamped metal cages have substantial roller retaining capabilities which serve the bearing well during assembly and maintenance procedures when the cone assembly must be handled apart from the cup.

While the typical metal cage has excellent retention characteristics, it is expensive to produce and install in that the steel has relatively little flexibility or elasticity. These limitations require installation of the cage on the cone with the cage bridges spread, that is somewhat bowed, for otherwise the cage will not pass over the rollers that are about the cone. Once the cage and rollers are around the cone, the bridges are straightened in a press operation. This requires very specialized equipment. The absence of significant elastic movement for steel also imposes design limitations.

To simplify assembly and increase design options, some bearing manufacturers have employed cages molded from suitable polymer resins. These cages are not only less expensive in their own right, but they are also more easily installed due to their flexibility. However, to provide adequate strength and roller retention, polymer cages heretofore developed have been quite large, their bridges often exceeding one-half the diameter of the rollers. As a result, these cages require a considerable amount of polymer resin to manufacture. Moreover, the large surface areas that these bridges present toward the rollers increase the contact forces between the rollers and cages and leave less free space for lubricant, both of which are undesirable.

SUMMARY OF THE INVENTION

One of the principal objects of the present invention is to provide a tapered roller bearing cage that is inexpensive to manufacture and simple to install. Another object is to provide a cage of the type stated that is injection molded from a polymer resin. A further object is to provide a cage of the type stated that has excellent roller retention characteristics. An additional object is to provide a cage of the type stated that serves to distribute the lubricant of the bearing uniformly over the surfaces of the rollers and in the proper thickness. Still another object is to provide a cage of the type stated that does not occupy a significantly greater portion of the bearing interior than a stamped metal cage. Yet another object is to provide a cage of the type stated that has sufficient strength and flexibility to permit easy installation over a bearing cone and rollers. An additional object is to provide a cage which is ideally suited for automotive wheel bearings of the tapered roller variety. These and other objects and advantages will become apparent hereinafter.

The present invention is embodied in a tapered roller bearing having a cage provided with at least one end ring and bridges projected from the end ring into the spaces between the tapered rollers of the bearing. The bridges lie beyond the pitch circle for the bearing, and each bridge along its side faces has inner and outer beveled surfaces, the latter of which is disposed at a lesser angle with respect to the pitch circle than the former. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur

DETAILED DESCRIPTION

Figure 1:
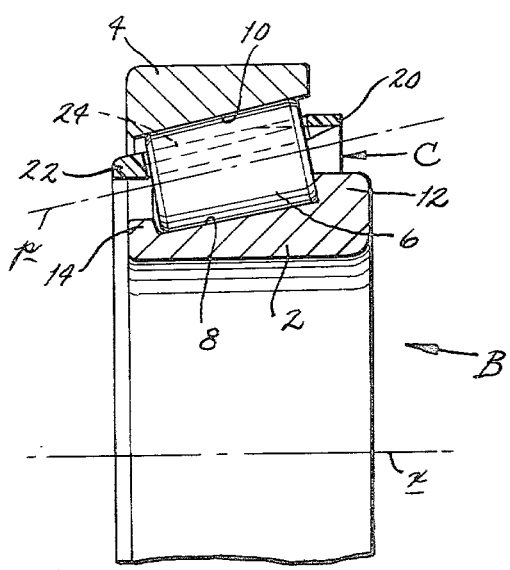
FIG. 1 is a sectional view of a single row tapered roller bearing provided with a cage constructed in accordance with and embodying the present invention.

Referring now to the drawings (FIGS. 1 and 2), B designates a tapered roller bearing that for the most part is conventional in construction, except that it has an improved cage C which is molded from a lightweight polymer resin. While the bearing B is a single row bearing of the type commonly used at the wheel locations of automotive vehicles, it should be recognized at the outset that the cage C is suitable for just about any type of tapered roller bearing having its rollers spaced sufficiently to accommodate a pocket-type cage.

Aside from the cage C, the bearing B includes a cone 2, a cup 4, and tapered rollers 6 arranged in a single row between the cone 2 and cup 4. To accommodate the rollers 6, the cone 2 is provided with a tapered raceway 8, while the cup 4 is likewise provided with tapered raceway 10 which is located directly opposite to and surrounds the raceway 8 of the cone 2. The tapers of the two raceways 8 and 10 are such that if those raceways are projected out to their respective apexes, those apexes will lie at a common point along the axis X of rotation for the bearing B. In addition, the cone 2, has a thrust rib 12 at the large diameter end of its raceway 8 and a retaining rib 14 at the small diameter end.

The large diameter ends of the rollers 6 bear against the thrust rib 12 when the bearing B is loaded, and that rib not only prevents the rollers 6 from being expelled from the space between the cone 2 and cup 4, but to a limited measure further serves to maintain the rollers 6 in proper angular orientation with respect to the axis X. The retaining rib 14 merely prevents the rollers 6 as well as the cage C from sliding off of the cone 2 when the cone 2 and cup 4 are separated.

The cage C, like the rollers 6, occupies the annular space between the cone 2 and cup 4 and primarily serves to maintain the proper spacing between the rollers 6, so that they remain evenly distributed along the raceways 8 and 10 when the bearing B is in operation. It further aids in maintaining the rollers 6 in the correct orientation. In addition, the cage C retains the rollers 6 on the cone 2 when the cone 2 and cup 4 are separated, so that the cone 2, its complement of rollers 6, and the cage C are unitized into a component known as a cone assembly. Furthermore, the cage C aids in the distribution of lubrication within the bearing B in that it spreads the lubricant into a hydrodynamic lubricant film on the side surfaces of the rollers 6, and channels the lubricant toward the large ends of the rollers 6 and the surface of the thrust rib 12 against which the large ends bear.

The cage C is injection molded from a polymer resin having high strength, some flexibility, and the ability to withstand sustained bearing operating temperatures of at least 250° F. A suitable polymer is heat stabilized nylon 6/6 which is a common, commercially available, thermoplastic resin. Moreover, the cage C is molded as an integral unit and is extracted from the mold as such.

Figure 2:
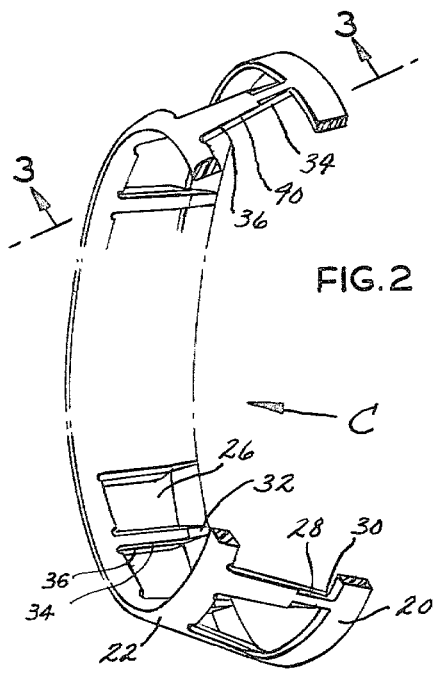
FIG. 2 is a perspective view of the cage partially broken away and in section.
Figure 4:
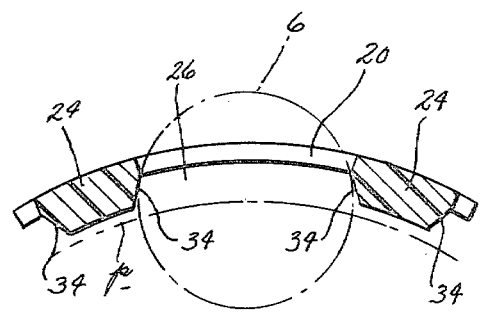
FIG. 4 is a sectional view taken along line 4—4 of FIG. 3.
Figure 6:
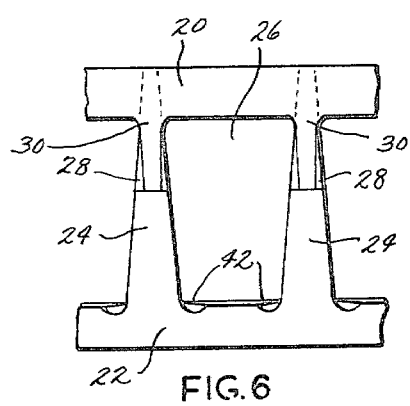
FIG. 6 is a partial plan view of the cage taken along line 6—6 of FIG. 5 and showing the configuration of one of the roller pockets and the bridges which delineate it.
Figure 5:
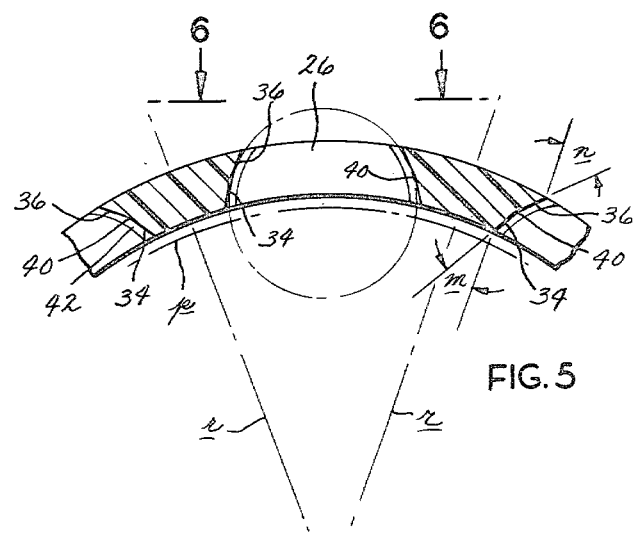
FIG. 5 is a sectional view taken along line 5—5 of FIG. 3.

The cage C basically includes (FIGS. 2–6) a large end ring 20, a small end ring 22, and bridges 24 that extend between the two end rings 20 and 22 at equally spaced intervals to provide the cage C with roller pockets 26. The size and configuration of the pockets 26 are such that they are capable of receiving the rollers 6 relatively loosely, yet confining them sufficiently to evenly space the rollers 6 around the cone 2. When the rollers 6 are so received, the large end ring 20 surrounds the thrust rib 12 and extends across the large end faces of the rollers 6 (FIG. 1). The small end ring 22, on the other hand, surrounds the retaining rib 14 and extends across the small end faces of the rollers 6. The bridges 24, which connect the two end rings 20 and 22, fit between the rollers 6 and serve to space the rollers 6 at equal intervals along the raceways 8 and 10. The diameters of the two end rings 20 and 22 are such that the bridges 24 which extend between them generally follow the taper of the axial centerlines for the rollers 6. In this regard, the axial centerlines of the rollers 6 when the bearng is set in operation describe or generate an imaginary cone having its apex at the common apexes for the raceways 8 and 10. Any circle along this cone is known as the pitch circle P (FIGS. 1, 4 and 5). Thus, the pitch circle P near the large end ring 20 has a larger diameter than a pitch circle P near the small end ring 22. The bridges 24 of the cage C lie entirely beyond the pitch circle P, in whatever plane it may be taken, and are no greater in section thickness than about 30% to 40% of the roller diameter at the same section plane.

Figure 3:
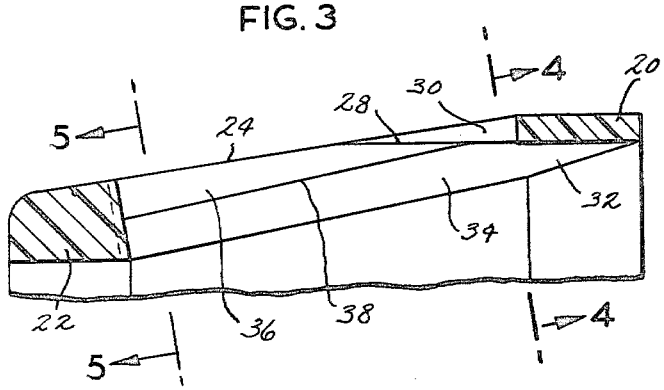
FIG. 3 is a sectional view taken along line 3—3 of FIG. 2.

The outwardly presented faces of the bridges 24 are flush with the outwardly presented surface of the small end ring 22, and the same holds true with regard to the inwardly presented surfaces of the bridges 24 and small end ring 22 (FIG. 3). Moreover, the outwardly and inwardly presented surfaces of the bridges 24 taper away from the bearing and cage axis X and are generally parallel for the full length of the bridges 24, although the outer surface narrows near the large end ring 20. Moreover, in this region the bridges 24 along their edges, but not their centers, become generally parallel to the axis X and form narrow triangular segments 28 of an imaginary cylinder having its center at the axis X. The inwardly presented surfaces of the bridges 24, however, remain at the same taper all the way to the large end ring 20. Due to the presence of the triangular segments 28, the bridges 24 neck inwardly toward large end ring 20, creating slight reliefs 30 at the junctures of the bridges 24 and the large end ring 20. Indeed, at the locations where the bridges 24 merge into the large end ring 20, the triangular segments 28 along the outwardly presented surfaces of the bridges 24 are at about the same diameter as the inwardly presented surface of the large end ring 20, and the inwardly presented surfaces of the bridges 24 are set inwardly from the inwardly presented surfaces of the large end ring 20. In order to securely join the bridges 24 to the large end ring 20, relatively narrow connecting ribs 32 are extended from the latter into the former. The reliefs 30 and the configurations which they generate are necessary in order to permit extraction of the cage C from a two-piece telescoping mold in which it may be formed.

The sides of the bridges 24 form the sides of the roller pockets 26 and each side includes a beveled inner surface 34 and a beveled outer surface 36, with the latter being presented further from the pitch circle P than the former (FIG. 5). Furthermore, both surfaces 34 and 36 are planar and intersect along a line 38 to provide a generally V-shaped recess 40. The two surfaces 34 and 36 in combination generally conform to the tapered side surfaces of the rollers 6 that are received in the pockets 26 and lie generally tangent to the side surfaces of the rollers 6. Moreover, the inner surface 34 and outer surface 36 are positioned such that convergent or wedge-shaped voids lead up to the point of tangency from the edges of those surfaces. While the inner surfaces 34 continue for the full length of the bridges 24, the outer surfaces, due to the presence of the triangular segments 28, fade away short of the large end ring 20. The outer surfaces 36, being presented at a lesser angle to the pitch circle P than the inner surfaces 34, in effect, serve as lips for enhancing the retention characteristics of the cage C. With respect to radii R emmanating from the axis X of rotation and passing through the centers of the bridges 24, the outer beveled surfaces 36 are located at a significantly greater angle than the inner beveled surfaces 34. Normally, the angle m of the inner beveled surfaces 34 ranges between 20° and 30° while the angle n of the outer beveled surfaces 36 ranges between 40° and 50°, the preferred angles depending on and varying with specific bearing geometry. Thus, at their small diameter ends, the rollers 6 are retained by both the inner and outer beveled surfaces 34 and 36 on the cage bridges 24, whereas at their large diameter ends, the rollers 6 are retained largely by the inner beveled surfaces 34.

Finally, the small end ring 22 adjacent to the locations where the bridges 24 intersect it contains undercuts 42 (FIGS. 5 and 6) which follow the general contour of the beveled surfaces 34 and 36 on the sides of the bridges 24 and indeed extend along those surfaces, thereby to a limited measure extending those surfaces into the body of the small end ring 22. The undercuts 42 serve as channels for permitting oil to circulate around the rollers 6, enabling those rollers to pump the lubricant toward their large diameter end faces and the thrust rib 12 along which those end faces lie. The undercuts 42 further eliminate any tendency for the end of the roller pockets 26, that is the surfaces of the pockets 26 along the small end ring 22, to guide the rollers 6.

The bearing B may be assembled in much the same manner as described in U.S. Pat. No. 4,136,916. However, in that patent the rollers, after the polymer cage is placed in a fixture, are forced into the roller pockets and the cage actually grips the rollers, holding them in place as the cone is forced through them. The cage C does not easily grip the rollers 6 due to the disposition of its bridges 24 beyond the pitch circle and the presence of the steeply beveled outer surfaces 36 along those bridges. In order to prevent the rollers 6 from falling out of the cage pockets 26, a plug having roller receiving notches opening out of its peripheral surface is placed in the cage C as the rollers 6 are loaded. This plug is withdrawn as the cone 2 is moved into the cage C. Of course the cage C, due to its flexibility and elasticity deflects to accommodate the temporary displacement of the rollers 6 as the cone retaining rib 14 passes through them.

In the operation of the bearing B, the cage C revolves between the cup 4 and cone 2 and follows the complement of rollers 6 as they roll along the raceways 8 and 10 of the cone 2 and cup 4, respectively. The bridges 24 of the cage C, being between adjacent rollers 6 insure that the rollers 6 are spread apart at even intervals along the raceways 8 and 10. Since the cage C is relatively thin, that is, no more than about 40% the diameter of the rollers 6, it provides adequate space around the rollers 6 for the bearing lubricant to circulate. Indeed, the fact that the beveled surfaces 34 and 36 are planar and generally tangential to the side faces of the rollers 6 prevents the two beveled surfaces 34 and 36 from precisely conforming to the contour of the roller side faces. As a consequence, the lubricant that is carried along the side faces is allowed to pass into the converging spaces between inner and outer beveled surfaces 34 and 36, on one hand, and the roller side faces, on the other, where it is reduced to a film thickness that is ideally suited for lubricating the surfaces of the rollers 6. In other words, the tangential contact between the surfaces 34 and 36 and the rollers 6 establishes a lubricant wedge or hydrodynamic lubricant film which is a very reliable lubricating technique. In contrast, surfaces which precisely follow the contour of the rollers and which end at sharp corners may skim practically all of the lubricant off of the side faces for the rollers so that the side faces are actually starved for lubrication during operation of the bearing B. Furthermore, the V-shaped recesses 40 in the bridges 24 tend to trap lubricant and thereby maintain the thickness of the lubricant film.

Finally, in the event that the bearing B is disassembled and the cone assembly is handled vigorously, the rollers 6 will be retained in the cage C in spite of the vigorous handling. In this regard, the outer beveled surfaces 36 along the sides of the bridges 24 overlie the rollers 6 and substantially reduce the width of the roller pockets 26. As a consequence, the cage C has significantly greater roller retention capabilities than polymer cages heretofore produced.

This invention is intended to cover all changes and modifications of the example of the invention herein chosen for purposes of the disclosure which do not constitute departures from the spirit and scope of the invention.

What is claimed:

1. In a tapered roller bearing including an inner race having an outwardly presented tapered raceway as well as a thrust rib that projects outwardly at the large end of the tapered raceway and a retaining rib that projects outwardly at the small end of the tapered raceway, an outer race having an inwardly presented tapered raceway that surrounds the raceway of the inner race, and a plurality of rollers arranged in a row between the two raceways with the large ends of the rollers being against the thrust rib and the axial centerlines of the rollers defining a pitch circle, an improved cage for maintaining the proper spacing between the rollers, said cage being formed as a unitary structure from a synthetic resin and comprising: a large end ring that encircles the inner race at its thrust rib and extends across the large end faces of the rollers, a small end ring that encircles the inner race at its retaining rib and extends across the small end faces of the rollers, and bridges that are formed integral with and extend between the end rings into the spaced between adjacent rollers, the bridges lying entirely beyond the pitch circle, so as to be closer to the raceway for the outer race than the raceway for the inner race, and having sides that are presented toward the frustoconical side faces of the tapered rollers, each side including inner and outer beveled surfaces which are substantially planar and intersect, the inner surface being located closer to the inner race than the outer surface and being presented at a greater angle with respect to the pitch circle so that the outer surface extends further over the side face of the adjacent rollers than the inner surface, both the inner beveled surfaces on each side of any roller and the outer beveled surfaces on each side of any roller being spaced and otherwise positioned to retain that roller and prevent it from moving significantly away from the raceway of the inner race when the inner race and the outer race are separated.

2. The structure according to calim 1 wherein the end ring that extends across the small ends of the rollers is provided, where it joins the bridges, with channels that extend through it from its inwardly to its outwardly presented surface.

3. The structure according to claim 1 wherein the inner beveled surfaces extend the full length of their respective bridges, but the outer beveled surfaces do not.

4. The structure according to claim 3 wherein the outwardly presented surfaces of the bridges on the cage taper outwardly away from the small end ring, and along their edges are further set inwardly from the outwardly presented surface of the large end ring.

5. The structure according to claim 4 wherein the cage further includes connecting ribs which are formed integral with the bridges and the large end ring and join the two firmly together.

6. The structure according to claim 1 wherein the inner beveled surface on each bridge of the cage intersects the radially inwardly presented surface of the bridge and the outer beveled surface intersects the radially outwardly presented surface.

7. The structure according to claim 1 wherein the angle between the inner beveled surface of a bridge and a radial plane passing through the center of that bridge and through the axis of rotation for the bearing is between about 20° and about 30° and the angle between the outer beveled surface and the radial plane is between about 40° and 50°.

8. The structure according to claim 1 wherein the inner beveled surfaces on the bridges are longer than the outer beveled surfaces.

9. The structure according to claim 1 wherein the thickness of the bridges at any cross-sectional plane along them does not exceed about 40% of the diameter of the rollers at the same cross-sectional plane.

10. In a tapered roller bearing including a cone having an outwardly presented tapered raceway as well as a thrust rib that projects outwardly at the large end of the raceway and a retaining rib that projects outwardly at the small end of the raceway, a cup having an inwardly presented tapered raceway surrounding the cone raceway, and a set of tapered rollers arranged in a row between the raceways of the cone and cup with their large ends against the thrust rib, the axial centerlines of the rollers at any point along the bearing defining a pitch circle, an improved cage for maintaining the proper spacing between the rollers, said cage being formed as a unitary structure from a synthetic resin and comprising: a large end ring that encircles the cone thrust rib, a small end ring that encircles the cone retaining rib, and bridges that are formed integral with and extend between the end rings, and together with the end rings form pockets in which the rollers are received, the bridges lying entirely beyond the pitch circle at any point along the bearing so as to be closer to the cup raceway than the cone raceway, the thickness of the bridges at any cross-sectional plane along them being no greater than that about 40% of the diameter of the rollers at the same cross-sectional plane, the sides of the pockets being formed by inner and outer beveled surfaces on the bridges, the inner and outer beveled surfaces along the sides of each bridge being substantially planar and intersecting, with the inner beveled surface being located closer to the cone raceway than the outer beveled surface and further being presented at a greater angle with respect to the pitch circle, both of the inner beveled surfaces along the sides of any pocket and both of the outer beveled surfaces along the sides of any pocket being spaced and otherwise positioned to retain the roller in the pocket and thereby prevent the roller from moving significantly away from the cone raceway when the cone and rollers are withdrawn from the cup.

* * * * *